United States Patent [19]

Hurley, Jr.

[11] Patent Number: 5,568,902

[45] Date of Patent: Oct. 29, 1996

[54] DESCENT, TRAVEL, AND PROTECTION APPARATUS, METHOD OF MAKING AND USING SAME

[76] Inventor: Rupert B. Hurley, Jr., 201 Ponders Rd., Greenville, S.C. 29615

[21] Appl. No.: 284,096

[22] Filed: Aug. 1, 1994

[51] Int. Cl.$^6$ ............................ B64B 1/04; B64D 1/14
[52] U.S. Cl. ................. 244/138 R; 244/33; 244/142; 244/158 R
[58] Field of Search .................... 244/138–145, 244/121, 158 R, 160, 30, 31, 32, 33, 125, 127

[56] References Cited

U.S. PATENT DOCUMENTS

| | | | |
|---|---|---|---|
| 1,281,846 | 10/1918 | Salari | 244/140 |
| 1,299,122 | 4/1919 | Calthrop | 244/140 |
| 1,765,075 | 6/1930 | Johnson | 244/138 R |
| 2,363,249 | 11/1944 | Hutchinson | 244/121 |
| 2,985,413 | 5/1961 | Widmanstetter | 244/140 |
| 3,330,510 | 7/1967 | Johnson | 244/138 R |
| 3,410,511 | 11/1968 | Coppa | 244/138 R |
| 3,520,503 | 7/1970 | McGehee | 244/138 R |
| 3,605,329 | 9/1971 | Dalli | 244/33 |
| 3,921,944 | 11/1975 | Morrison | 244/138 R |
| 4,971,269 | 11/1990 | Koda | 244/158 R |
| 5,265,829 | 11/1993 | Roberts | 244/138 R |

FOREIGN PATENT DOCUMENTS 517537  3/1955  Italy ..................... 244/138 R

Primary Examiner—Galen L. Barefoot
Attorney, Agent, or Firm—Rupert B. Hurley, Jr.

[57] ABSTRACT

An apparatus comprises a deformable structure surrounding a volume, and means for suspending a fragile cargo in spaced relationship above an impact zone on said deformable membrane. The apparatus is designed to: prevent damage to fragile cargo therein; lengthen a duration of the cargo impact period; reduce terminal vertical freefall velocity of the cargo relative to a terminal vertical freefall velocity of the cargo alone; and lengthen a duration of a cargo/craft fall period for falls from extreme heights. Preferably, the apparatus is spherical in shape, substantially transparent, and has a plurality of flexible strut members for suspending the fragile cargo in spaced relationship above an impact zone of said apparatus.

23 Claims, 9 Drawing Sheets

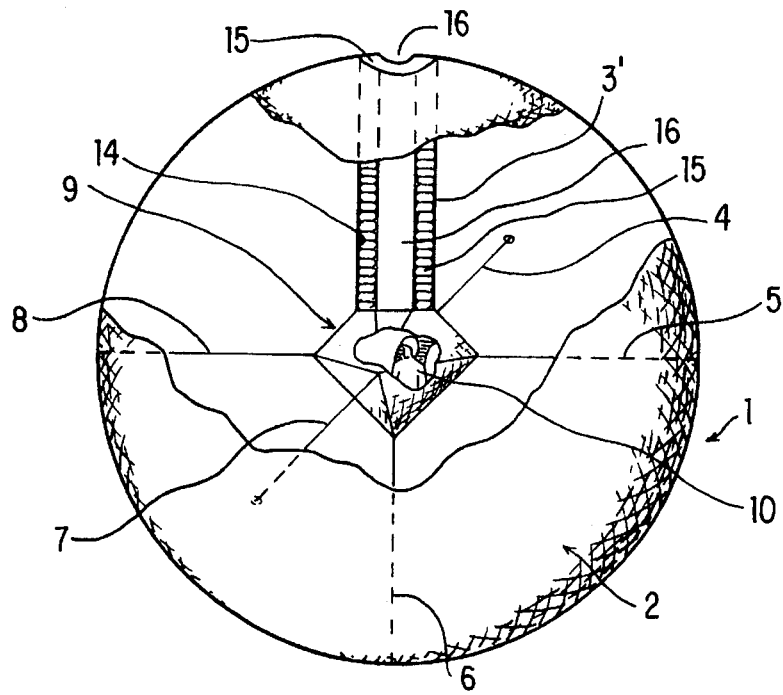
FIG. 2A
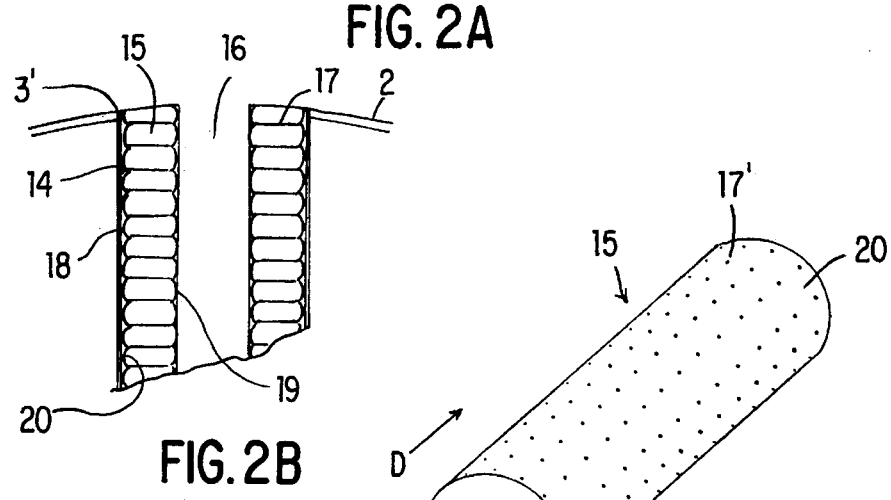
FIG. 2B
FIG. 2C
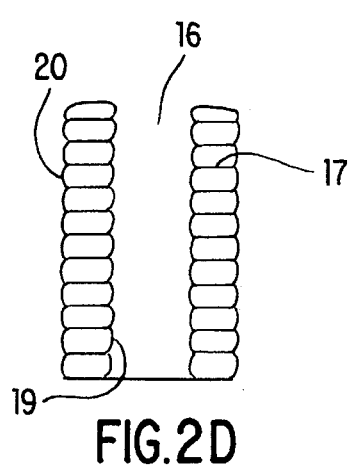
FIG. 2D

DESCENT, TRAVEL, AND PROTECTION APPARATUS, METHOD OF MAKING AND USING SAME

BACKGROUND AND RELATED INFORMATION

1. Field of the Invention

The present invention relates to aircraft, watercraft, and landcraft, but especially aeronautical safety lowering devices, such as parachutes and balloons, and to escape devices, such as fire escapes.

2. Background of the Invention

For at least eighty years it has been a desired objective to provide apparatuses for cargo, often in the form of a human being, to survive descents, especially free fall through the air, from heights, especially great heights. By far the most predominant apparatus for this purpose is the parachute, which has been brought to a state of high refinement, with many specific designs, features, and variations known to those of skill in the art.

However, problems remain in the use of the parachute, as it is subject to: failure of opening; entanglement with itself and/or the cargo; collapse due to swaying of the cargo or impact with an object; requiring a relatively high degree of skill to pack, deploy, and land; relatively high wind drift producing lack of precision and lack of accuracy in landing at a desired landing site; inability to drop during extreme weather conditions; inability to be predeployed before low altitude drops of, for example, 100 vertical feet; inability to protect the cargo from fire, for example, when dropping from a burning building several stories in height; inability to safely land in rugged terrains, such as dense forest, steep canyon and mountain surfaces, raging seas and rivers, or even in a city having a concentrated cluster of high rise buildings; allowing an enemy to visually detect the type and amount of cargo being dropped to a location; subjecting the cargo to the potentially extreme effects of weather and atmospheric friction during and after descent; and a relatively slow descent rate necessitated by the relatively intense impact of the cargo with the ground, upon termination of descent; and, enabling an enemy to have a sustained opportunity to damage or harm the cargo, especially human cargo.

Primary and supplemental (interior and exterior) stairways have long been used as fire escapes. However, they are often useless during fires because they subject victims to intolerable levels of smoke, heat, and/or flames. Furthermore, ladders and chutes used as fire escapes frequently cannot be extended far enough to permit escape from high rise buildings of many stories, and also subject victims to smoke, heat, and flames. Individuals jumping from buildings to safety below reach injurious velocities before striking the ground. Often, firefighters cannot get close enough to the building to provide an inflated pad, and even if such is provided, jumpers are not always fortunate enough to land on the pad, or strike the pad at an extreme speed or awkward position, resulting in injury, often fatal injury.

Recreational use of descent devices such as hang gliders and bungee cords have become popular in recent decades. Other descent devices, such as parachutes, roller coasters, downhill skis, ski-jumping skis, and toboggans, have been popular for many decades. However, unrestrained, free-fall descent by relatively heavy, fragile cargo, including human beings, remains highly destructive and/or extremely risky, especially in some potentially exciting environments, such as within severe weather systems such as thunderstorms and tornadoes, down slopes of mountains, canyons, and over and through large waves, especially large breaking waves.

Occupants of ships must occasionally abandon sinking and/or burning ships during storms, fires, explosions, etc. Frequently cold and/or rough seas, and cold and/or windy weather, produces conditions unfit for human survival for even several hours, even if a life vest and/or life raft are available. It is not unusual for many abandoning ship to drown from such conditions, as rescue can require hours or even days. Currently there is no means to virtually encapsulate those abandoning ship in a rugged, light craft, virtually immune to the destructive effects of rough seas, while keeping fragile cargo, especially human cargo, from severe exposure to the effects of water, wind, and cold temperatures common in storms at sea, while rescuers search for survivors and other valuable cargo. Furthermore, there are currently few watercraft suited to carrying fragile, relatively heavy cargo down raging rivers, through breaking waves, and over waterfalls, without severe risk to the cargo, especially human cargo.

Moreover, currently there is no single craft designed to simultaneously serve the combination of roles of descent aircraft, descent landcraft (for sloped surfaces such as mountains and canyon walls), as well as watercraft, while providing any reasonable hope of protection of fragile, relatively heavy cargo, including human beings. Prior art craft suitable to free-fall descent through the air, such as parachutes, are unsuited to ensuring preservation of the cargo upon impact of the cargo and/or chute impact with a steep canyon wall, and/or a water landing, not to mention the combination of free-fall through the air followed by impact with, for example, a canyon wall, followed by landing in a raging river, in a single, continuous descent.

Furthermore, space vehicles orbiting the earth frequently drop back into the atmosphere and are destroyed by the heat of reentry. Reusable vehicles, such as the space shuttle, utilize insulating tiles capable of withstanding extremely high temperature in order to survive the heat produced upon reentry. This extreme and destructive heat generated on reentry of spacecraft is caused by the very high speed associated with reentry, and the friction of the craft passing through the atmosphere at such high speed. If the speed of reentry could be reduced significantly, and/or if the friction can be dissipated over a substantially larger surface, the temperature generated could be reduced to tolerable levels, and the returning spacecraft or satellite could be recycled, especially if the means for speed reduction and heat dissipation also serves to protect the vehicle upon impact. Moreover, the means to protect the vehicle could also protect the site upon which the vehicle lands, reducing damage to the natural environment, man-made objects, and even human beings.

A device is known in which a human being is partially within an inflated balloon, while in descent through the air. The balloon lacks any internal structure. Another device in known in which a human being, dangling from a parachute while descending through the air, also wears an inflated suit having multiple compartments. The inflated suit has the general overall shape of the occupant, i.e., has arms, legs, heat, and body portions, and has a thickness of less than half of the width of the occupant across the front of the chest.

Recently the automotive industry has incorporated airbags into the steering wheel and dash panels of motor vehicles. These airbags have proven to protect those body portions of occupants colliding therewith, even upon deceleration from, for example, 60 miles per hour to 0 miles per hour, in a distance of less than 2 feet. The lack of damage to the occupant is a testament to the human body's ability to survive extreme decelerations if spread over a substantial surface and if extended over time.

SUMMARY OF THE INVENTION

The craft of the present invention is directed to an apparatus comprising a deformable structure surrounding a volume, and means for suspending a cargo above an impact zone on the deformable structure. The apparatus is structured to carry out one or more of the following functions, and/or achieve one or more of the following advantages:

(1) to prevent damage to cargo upon impact from a vertical freefall of 30 feet onto a substantially horizontal concrete surface;

(2) to lengthen a duration of a period of cargo impact, by a factor of at least 5, upon impact from a vertical freefall onto a substantially horizontal concrete surface from a height of 30 feet, relative to a cargo impact period of the cargo alone undergoing impact from a vertical freefall from a height of 30 feet;

(3) to reduce, by at least 25%, a terminal vertical freefall velocity of a cargo in the apparatus, relative to a terminal vertical freefall velocity of the cargo alone; and (4) to lengthen, by at least 25%, a duration of cargo/craft fall period from a vertical freefall from a height of 5000 feet, relative to a duration of the cargo-alone fall period from a vertical freefall from a height of 5000 feet.

Preferably, the apparatus comprises an inflated, deformable membrane surrounding an enclosed, substantially airtight volume, the membrane having a minimum dimension of at least about 8 feet, the apparatus further comprising means for suspending a fragile cargo in spaced relationship above an impact zone of said apparatus.

In the manner of the above four descriptions of advantages, basic principles in the operation of the present invention are utilized, and one or more of the following objectives associated with use of the present invention are achieved.

Preferably, the apparatus of the present invention comprises an inflated, deformable, membrane surrounding an enclosed, substantially airtight volume, with the membrane comprising a hull establishing a substantially spherically-shaped outer perimeter of the apparatus, and preferably the means for suspending the cargo comprises one or more struts between a centrally-located cargo compartment and the hull. Preferably the membrane has a diameter of at least 8 feet; more preferably, at least 15 feet; and still more preferably, from about 15 to 80 feet.

The apparatus preferably comprises from 4 to about 1000 flexible strut members positioned between the cargo compartment and the hull. The apparatus can comprise a single substantially airtight enclosure surrounded by the inflatable membrane, or a plurality of separate enclosures surrounded by a partitioned membrane and/or a set of membranes. Preferably the membrane is inflated with at least 50% (by weight) air, and/or a lighten-than-air gas, such as helium or hydrogen. However, the membrane may even be inflated with a heavier-than-air gas, such as carbon dioxide.

The apparatus can be provided with means to reduce rebound upon impact, especially a descent-terminating impact.

The apparatus preferably comprises means for a human passenger, in the cargo compartment, to view an environment surrounding the craft, through the membrane of the craft. This is preferably accomplished by constructing part or all of the apparatus of transparent materials.

Any one or more portions of the apparatus may comprise fibrous reinforcement which strengthens, and toughens, the apparatus, making the apparatus capable of withstanding higher forces during descent, and resisting breaches of integrity during impact.

Any one or more portions of the apparatus may comprise a composition and/or structure which can be elongated (elastically or inelastically), in order to further decrease the impact of the cargo during impact of a loaded apparatus, both at termination of descent and during descent.

For some embodiments, the apparatus preferably comprises a primary membrane and a secondary membrane. The primary membrane comprises the hull and a tunnel wall forming a primary tunnel from the hull to the cargo compartment, and serving, secondarily, as a hollow strut positioned between the hull and the cargo compartment. The primary tunnel and the cargo compartment are both outside the enclosed, substantially airtight volume within the inflated, deformable primary membrane. The tunnel is preferably sized to permit loading and unloading of the cargo. Of course, the primary purpose of the tunnel wall is to provide an access route for the cargo into and but of the cargo compartment.

Preferably the apparatus further comprises a secondary inflatable membrane designed to be secured within the primary tunnel after the inflation of the primary membrane. This secondary inflatable membrane can prevent the cargo from exiting through the tunnel, and can provide additional protection and shock absorption for the cargo, due to impact at the tunnel, by objects the apparatus impacts or otherwise contacts.

Preferably the secondary inflated membrane comprises a secondary tunnel which permits a supply of fresh air to enter the cargo compartment, while prohibiting egress of the cargo through the primary tunnel. The apparatus may comprise just one primary tunnel, or one or more primary tunnels with one or more secondary tunnels. If the cargo comprises a live animal, e.g., human cargo, it is preferred to have a plurality of tunnels for supplying fresh air to the cargo compartment, in order to enhance the flow of air into the cargo compartment while live cargo is in the cargo compartment.

In another embodiment designed for a specific use, i.e., an embodiment designed for "rolling use", a preferably spherically-shaped apparatus "rolls" during descent, and/or travels across a substantially horizontal surface (e.g., water). This apparatus preferably comprises a spherically-shaped, inflated, deformable membrane and a hollow, preferably rigid inner sphere surrounding a cargo compartment and connected to the deformable membrane by suspension means comprising one or more struts. Preferably the cargo compartment is designed with means to keep the cargo (preferably, human cargo) in an upright position during descent (or travel) of he apparatus. This can be accomplished with a weighted chair having a backside provided with a bearing surface for low-friction contact with an inside surface of the rigid inner sphere, so that as the rigid inner sphere "rolls" during descent or lateral movement of the apparatus, the weighted chair remaining substantially upright throughout descent. Preferably, the apparatus comprises means for preventing the backside of the chair from disengaging the inner spherical surface of the rigid inner sphere.

An alternative is to provide a weighted third sphere within the hollow, rigid inner sphere (which forms the cargo compartment), with a "liquid bearing" formed by a liquid in the bottom of the hollow, rigid sphere, which is partially displaced by the third sphere and cargo therein. In either of these manners, the cargo can remain in a substantially upright position throughout most, if not all, of the descent and/or travel, rather than being reoriented as the apparatus rotates during descent and/or travel. Such continuity of orientation decreases discomfort which often occurs from orientational changes, and makes the descent and/or travel much more pleasurable by enhancing the ability of a passenger to view the environment outside the craft.

Preferably, the apparatus is designed to reduce the terminal vertical freefall velocity of the cargo by at least 25 percent, preferably at least 40 percent, relative to a terminal vertical freefall velocity of the cargo alone.

A preferred descent craft is as described immediately above, and further comprises a deformable membrane comprising a hull establishing a substantially spherically-shaped outer perimeter of the descent craft. The means for suspending the cargo comprises one or more struts (preferably a plurality) between a centrally-located cargo compartment and the hull. Preferably, the membrane is substantially spherical in shape, and preferably has a diameter of at least 8 feet; more preferably, at least 15 feet; still more preferably, from 15 to 80 feet. Upon release, the loaded descent craft undergoes vertical freefall from the elevated location. Preferably, the descent craft has a design effective to reduce, by at least 50%, a terminal vertical freefall velocity of the cargo in the descent craft, relative to a terminal vertical freefall extending from the elevated location to a landing location on the earth.

The descent craft further comprises a secondary inflatable membrane designed to inflate so that it is secured within the primary tunnel, to prevent the cargo from exiting through the primary tunnel, and to provide additional protection and shock absorption for the cargo, from impact at the primary tunnel, and intrusion through the primary tunnel, by an object contacted by the descent craft. The secondary inflatable membrane secured in the primary tunnel comprises internal struts positioned between an outer secondary membrane portion and an inner secondary membrane portion. The inner secondary membrane portion forms a secondary tunnel sized to prohibit egress of said cargo while permitting a supply of fresh air to enter the cargo compartment.

Preferably, the descent craft further comprises a hollow, rigid inner sphere connected to the deformable membrane by one or more struts, and a passenger compartment within the inner sphere. The passenger compartment comprises means to maintain a passenger in an upright position during descent of the apparatus, and the membrane is constructed from a transparent material. The hollow, rigid inner sphere is constructed from a transparent material, and the descent craft comprises means to allow a continuous supply of outside air into the rigid, hollow inner sphere. The descent craft further comprises means to maintain the human passenger upright during descent, preferably in the form of a weighted seat comprising a bearing member on the back side thereof.

Preferably the means for suspending the cargo comprises at least one strut, more preferably, a plurality of struts, the struts extending from the cargo to the hull. More preferably, the apparatus comprises at least four strut members, these at least four strut members preferably being spaced at maximum spread from one another; still more preferably, at least six strut members; yet still more preferably, at least 12 strut members. The strut members may be relatively inextendible, or the strut members may be relatively elastic, i.e., elongate upon being stressed. To achieve some purposes, it is preferable for the strut members to be reversibly elastic upon elongation, and to achieve other objectives, it is preferable for the strut members to be permanently deformed, and substantially inelastic, upon elongation.

Preferable, the aircraft has an outer perimeter which is substantially spherical. Preferably, the cargo has a center of gravity near or at about the center of the sphere. However, to achieve certain objectives, it is preferable for the cargo to be positioned off of the center of the craft.

For most uses, the aircraft preferably has a design effective to reduce an unassisted terminal vertical descent velocity of the cargo by greater than or equal to about 25 percent; still more preferably, at least about 40 percent.

To achieve certain objectives, the membrane is preferably constructed from a substantially transparent composition, while to achieve other objectives, the membrane is constructed from a substantially opaque composition. Preferably, the membrane is constructed to resist punctures and rips, preferably through the presence of fibrous reinforcing materials. Preferably, the membrane has an elasticity which, when coupled with the elasticity of the one or more struts, is sufficient to impart a desired degree of impact absorption in order to protect the cargo during impact.

In another embodiment, the present invention is directed to a watercraft for floating on the surface of a body of water. The watercraft comprises a hull establishing the outer perimeter of the watercraft, and a means for suspending the cargo within the outer perimeter of the watercraft. The hull comprises an inflated, substantially airtight membrane. The cargo is substantially surrounded by the outer perimeter of the watercraft. The means for suspending the cargo within the outer perimeter of the craft comprises one or more struts extending from the cargo to the hull.

The watercraft has a design effective to keep the cargo in spaced relationship from the water, independent of the orientation of the watercraft to the water, and to protect the cargo from the effects of immersion in the water, to insulate the cargo from the effects of exposure to the environment, and to protect the cargo from the impact of breaking waves, rocky shores, etc.

The present invention is also directed to a descent process, in which a descent craft and cargo are provided at an elevated location. The descent craft is as the apparatus described above. That is, a preferred descent craft comprises an inflated, deformable membrane surrounding an enclosed, substantially airtight volume, said membrane having a minimum dimension of at least 8 feet, and means for suspending cargo in spaced relationship above an impact zone of the craft. The cargo is loaded into the descent craft, and the loaded descent craft is then released from the elevated location, and allowed to descend from the elevated location.

The cargo can be loaded into the descent aircraft either before or after the membrane is inflated.

The process is preferably as described above, with the membrane being a primary membrane. The primary membrane further comprises a tunnel wall forming a primary tunnel from the hull to the cargo compartment, serving as a hollow strut member positioned from the hull to the cargo compartment. The primary tunnel and the cargo compartment are outside the enclosed, substantially airtight volume within said inflated, deformable primary membrane. The primary tunnel is preferably sized to permit ingress and egress of the cargo.

The process may further comprise at least at least a portion of the descent on a slope having an average incline of between 20 degrees and 90 degrees.

In a preferred process, the cargo is loaded into the descent craft, with the loaded descent craft being heavier-than-air.

The loaded descent craft is then hauled to the elevated location via a tethered, lighter-than-air craft, to which said heavier than air loaded descent craft is attached. The loaded descent craft is then released from the lighter-than-air craft at the elevated location. Of course, the tethered lighter-than-air craft can be retrieved after release of the loaded descent craft. In this manner, the lighter-than-air craft can be raised and lowered repeatedly, in order to repeatedly haul the descent craft up to the elevated location, for release thereof.

Optionally, the process can further comprise a guide cable positioned from the elevated location to a predetermined landing location, with the loaded descent craft being provided with means to follow the guide cable during its descent. The process can be carried out with the guide cable positioned along a directed course of descent, in which the guide cable is supported at a plurality of positions, so that the loaded descent craft can descend over the directed course of descent. For example, the descent cable can be highest at a position directly over a-beach, with a plurality of descent cable support points held by lighter-than-air craft at various positions out over the water offshore, with the descent cable being positioned successively from one craft to another, preferably finally returning to the point on the beach directly below the highest point of the descent cable, i.e., the starting point. In this manner, the apparatus of the present invention can undergo a controlled descent out over water, terminating descent back at the highest point start position from which the passenger, in the apparatus, was originally elevated to by a lighter-than-air craft hauling the apparatus and passenger to the start elevation. This process is schematically illustrated in FIG. 13.

The apparatus of the present invention, when used as a descent craft for freefall descent through the atmosphere, provides advantages over parachutes in that it has a "forced deployment" via inflation by an inflation means, thereby eliminating the risk of a failed deployment due to entanglement, etc., as well as eliminating the risk of collapse, as the inflated membrane is not subject to the whims of the wind direction and velocity and accompanying swaying cargo. The aircraft of the present invention requires little or no skill in packing, deploying, or terminating descent, and unlike a parachute, can be predeployed. The aircraft of the present invention can be designed to produce relatively low wind drift, producing greater precision and accuracy in landing at a desired landing site, through the use of relatively high descent speeds, and can be used with relative safety in extreme weather conditions, at night, and at low altitudes necessitating a short deployment time. The aircraft can also be designed to reduce risk to ground-based individuals in the landing zone, from extreme impact from the falling cargo, allowing drops of cargo, including human beings, directly over a populated landing site. The descent craft can be designed to protect its cargo from fire, for example, when dropping from a burning building several or many stories in height, by being constructed from a heat-resistant and flame-resistant composition. The descent craft can also be constructed for safe landings in rugged terrains, such as dense forest, regions having steep, rugged canyon walls and steep, rugged mountain slopes, raging seas and rivers, or even a city having a concentrated cluster of high rise buildings, by being constructed from a high strength material. The descent craft of the present invention can also be designed to operate at a terminal velocity much higher than that of a parachute, while still protecting the cargo, thereby allowing an enemy much less time to damage or harm the cargo, and offer a target much more difficulty to hit, and can be made opaque so that an enemy cannot visually detect the type and/or amount of cargo being dropped to a location. The aircraft of the present invention can encapsulate the cargo and thereby protect the cargo from the potentially extreme effects of weather and atmospheric friction during and after descent. Unlike a parachute, the aircraft of the present invention can also allow a cargo of human beings to land safely and deploy from such rugged environments as, for example, the tops of trees in a forest, and thereafter safely unload from the aircraft by lowering themselves via a rope attached to the craft.

The descent craft of the present invention can provide an escape means for human beings (and cargo) otherwise unable to avoid harm due to a fire in a building, without concern for smoke, heat, and flames which must be passed through during descent to safety, and without regard to the presence of a landing pad or the height of the drop site. The descent craft can be designed to reduce fear of heights and fear of falling by an occupant, by providing a totally opaque field of view for the occupant during preparation for descent, and during actual descent and impact.

The craft of the present invention offers adventurers with an opportunity to engage in free-fall conditions, and in conditions in which the craft is propelled by forces of nature, especially in previously unconquered or seldom conquered environments, such as off high buildings, down high mountains, over and/or through high waves, especially breakers, over waterfalls, down rapids, down and into extremely rugged terrains such as cliffs and canyons, and even in and through extreme weather conditions such as thunderstorms, hurricanes, and even tornadoes, and even combinations of these environments simultaneously, with far less risk than has previously been possible. Furthermore, the aircraft/watercraft of the present invention extends adventurous opportunities to individuals of lesser strength, stamina, and/or skill, including injured, handicapped, and aged individuals.

The apparatus of the present invention also extends to the descent and/or flotation of scientific instruments into various environments highly unsuited to human presence, such as hurricanes and tornadoes, for purposes of scientific investigation, as in the study of the internal environment of a tornado, waterspout, or other severe storm system.

The watercraft of the present invention provides increased chance of survival to crews and passengers who abandon ship or fall overboard, as the watercraft of the present invention can be designed to be of unprecedented seaworthiness and can be designed to virtually encapsulate one or more passengers, until rescue.

The apparatus of the present invention is also useful as a rescue craft which can be suspended from a tether on a helicopter, etc., with a rescuer inside the apparatus, who can toss a line, or supply another craft, to a rescue, for example, in a stormy sea.

The apparatus of the present invention can be designed to provide a means for lowering the speed of space vehicles during reentry into the earth's atmosphere, by providing a craft and cargo combination of dramatically lower density, also provided with a heat dissipation surface of dramatically larger size, to disperse heat and thereby lower the resulting temperature produced during reentry. Furthermore, the apparatus of the present invention can also be designed to provide insulation against overheating the cargo, and impact-protection to the cargo, as well as being designed to protect the landing site from damage by the reentering craft.

BRIEF DESCRIPTION OF THE DRAWINGS

FIG. 2A illustrates a perspective, cutaway view of a second embodiment of an apparatus according to the present invention, together with a passenger therein.

FIG. 2B illustrates an enlarged cross-sectional view of a portion of FIG. 2A, taken through section 2B—2B of FIG. 2A.

FIG. 2C illustrates a perspective view of a secondary membrane of the apparatus illustrated in FIG. 2A.

FIG. 2D illustrates a perspective cross-sectional view of the secondary membrane illustrated in FIG. 2A, 2B, and 2C.

DETAILED DESCRIPTION OF THE INVENTION

Figure 1A:
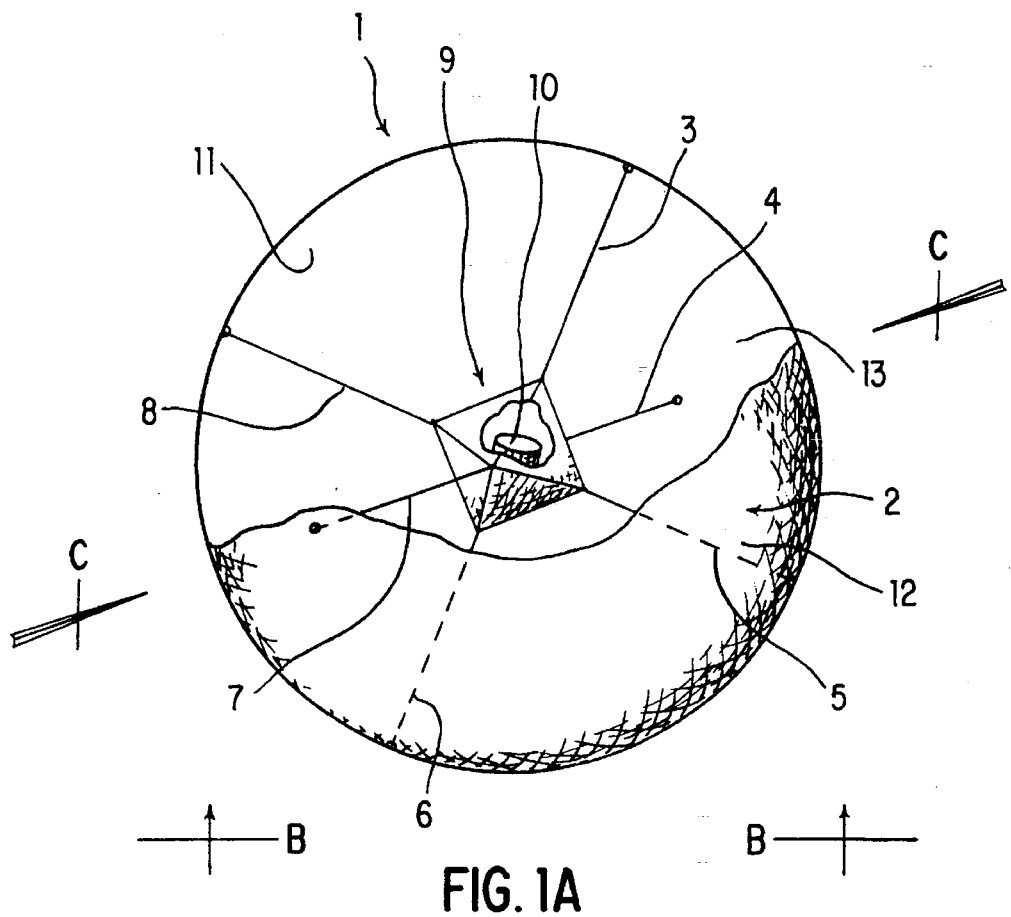
FIG. 1A illustrates a perspective cutaway view of a first embodiment of an apparatus according to the present invention, together with cargo therein.

As used herein, the phrase "deformable structure" refers to a structure which can be deformed without disintegrating, regardless of whether the structure recovers to its conformation before the deformation. Preferably, the deformable structure comprises a flexible membrane, such as a web (i.e., film or sheet material), which when inflated and thereafter deforms, recovers substantially to its conformation before deformation, without being punctured or torn, and without bursting due to the pressure increase cause by impact.

FIG. 1 illustrates an embodiment of apparatus (1) according to the present invention. Apparatus 1 of FIG. 1 can be used as an aircraft, watercraft, or landcraft, but is particularly suited to use as a descent aircraft.

Apparatus 1 comprises deformable structure 2 (i.e., hull) connected to cargo compartment 9 by a set of six strut members (3, 4, 5, 6, 7, and 8). As illustrated in FIG. 1, cargo compartment 9 is loaded with cargo 10. Cargo 10 is not considered to be part of apparatus 1 per se, but is included in FIG. 1 (and various additional Figures included herein) in order to more efficiently communicate an understanding of the nature of apparatus 1, and a preferred cargo location within apparatus 1. The six struts are radially oriented (i.e., positioned along paths of minimum distance) from cargo compartment 9 to interior surface 11 of deformable structure 2. The six struts are positioned at "maximum spread" from one another, in order to optimize the suspension of cargo 10 in apparatus 1. Inflating fluid 13 is provided between the outer surface of cargo compartment 9 and inner surface 11 of deformable structure 2. The inflating fluid can also be present within cargo compartment 9, if so desired. The deformable structure is preferably substantially airtight.

Figure 1B:
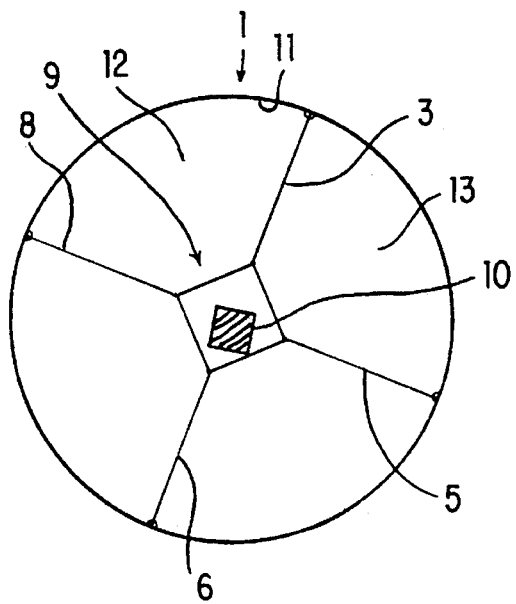
FIG. 1B illustrates a cross-sectional view of the apparatus and cargo illustrated in FIG. 1A, taken through section B—B of FIG. 1A.
Figure 1C:
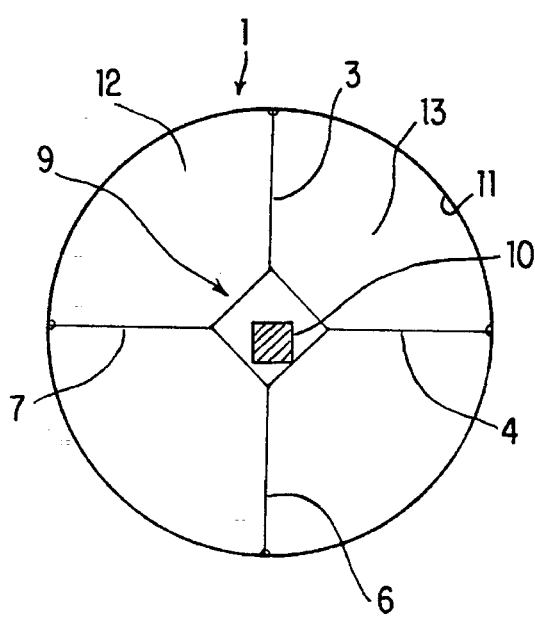
FIG. 1C illustrates a second cross-sectional view of the apparatus and cargo illustrated in FIG. 1A, taken through section C—C of FIG. 1A.

FIGS. 1B and 1C illustrate cross-sectional views of FIG. 1A, taken through sections B—B and C—C, respectively. FIG. 1B, taken through vertical plane B—B passing through the diameter of the sphere of FIG. 1A, includes strut members 3, 5, 6, and 8, which are in the plane of the paper on which FIG. 1A is drawn. FIG. 1C, taken through vertical section C—C of FIG. 1A, also passes through a diameter of the sphere of FIG. 1A, but in a plane oriented 90°, i.e., perpendicular) to the plane of FIG. 1B, i.e., a plane including struts 3, 4, 6, and 7 as illustrated in FIG. 1A. Furthermore, for purposes of illustration, FIG. 1C is rotated about 20° counterclockwise from FIG. 1B, i.e., as apparent from the fact that in FIG. 1C, strut 3 is in a substantially vertical position, unlike strut 3 as illustrated in FIGS. 1A and 1B. FIGS. 1B and 1C are provided together with FIG. 1A, to aid in understanding the positioning of the six strut members.

FIG. 2A illustrates a perspective view of alternative apparatus 1', comprising deformable structure 2 (i.e., a hull), tubular strut assembly 3', five flexible, "solid" strut members 4, 5, 6, 7, and 8, and cargo compartment 9. Passenger 10 is illustrated as present in cargo compartment 9. Hollow strut assembly 3' comprises tubular strut membrane 14, as also illustrated in FIG. 2B. Hollow strut assembly 3' extends from deformable structure 2 to cargo compartment 9. Within tubular strut membrane 14 is inflatable pipe 15, illustrated in its fully inflated configuration. Inflatable pipe 15 surrounds air passageway 16 extending from the atmosphere surrounding apparatus 1' into cargo compartment 9, thereby providing a source of fresh air to cargo compartment 9.

FIG. 2B illustrates a detailed, cross-sectional, close-up view of a portion of strut assembly 3' and deformable structure 2, as per FIG. 2A. FIG. 2B illustrates the relationship between inflatable pipe 15 and interior surface 38 of tubular strut membrane 14, as well as the relationship between exterior surface 18 of tubular strut membrane 14, and deformable structure 2 of apparatus 1'. FIG. 2B also illustrates a plurality of struts 17, positioned along portions of radii emanating from a central longitudinal axis (axis not illustrated) of inflatable pipe 15. Struts 17 are radially positioned from inner pipe membrane 19 (see FIG. 2D) to outer pipe membrane 20. Struts 17 serve to keep inner pipe membrane 19 from collapsing inwardly due to the pressure within the pressurized volume within inflatable pipe 15, so that an air passageway is maintained from the environment surrounding the craft to cargo compartment 9.

Inflatable pipe 15 prevents tubular strut membrane 14 from being distorted by higher-than-atmospheric pressure within deformable structure 2, which would otherwise collapse passageway 16 inwardly, thereby potentially blocking off the supply of fresh air to passenger 10 within passenger compartment 9. Preventing the collapse of tubular strut membrane 14 can be insured by providing the pressurized volume within inflated pipe 15 with a pressure substantially higher than the pressure within deformable structure 2.

FIG. 2C illustrates a perspective view of inflatable pipe 15 in its inflated configuration, showing primarily outer membrane 20 thereof, and an end surface 21 thereof. A plurality of strut bonds 17' are illustrated on the outer surface of inflatable pipe 15. The fresh air passageway 16 extends through the entire length of inflated pipe 15.

FIG. 2D illustrates a longitudinal cross-sectional view of a portion of inflatable pipe 15, taken through section D—D of FIG. 2C. FIG. 2D provides a partial length cross-sectional view of inner pipe membrane 19 and outer pipe membrane 20, as well as illustrating the position of struts 17 relative to outer pipe membrane 20 and inner pipe membrane 19.

Figure 2E:
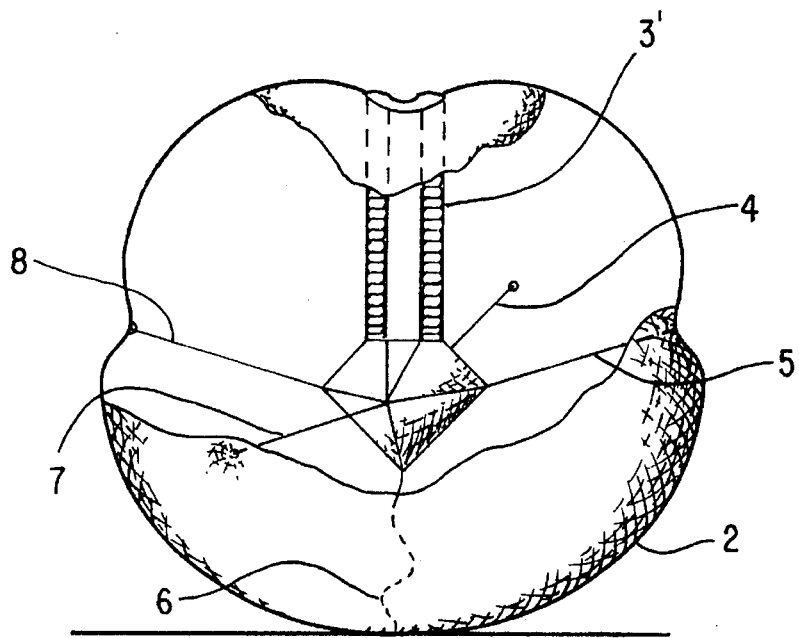
FIG. 2E illustrates a perspective cutaway view of a loaded, spherically-shaped apparatus as illustrated in FIG. 2A, shortly after initial impact with the ground.

FIG. 2E illustrates a spherical apparatus upon initial impact with the ground, e.g., upon termination of a free fall descent. Upon impact, deformable structure 2 deforms (i.e., flexes to result in a distorted hull shape) due to forces exerted at the point of impact, as well as from some of the points of attachment of the struts to the cargo or cargo compartment. However, note that strut 6, positioned between the cargo and the ground, becomes limp, due to the continued downward movement of the cargo towards the impact point. Struts 3', 4, 5, 7, and 9 are placed into greater tension upon impact, and thereby apply force to the hull at positions above the cargo, thereby serving to deform an "upper portion" of the distortable structure.

Figure 2F:
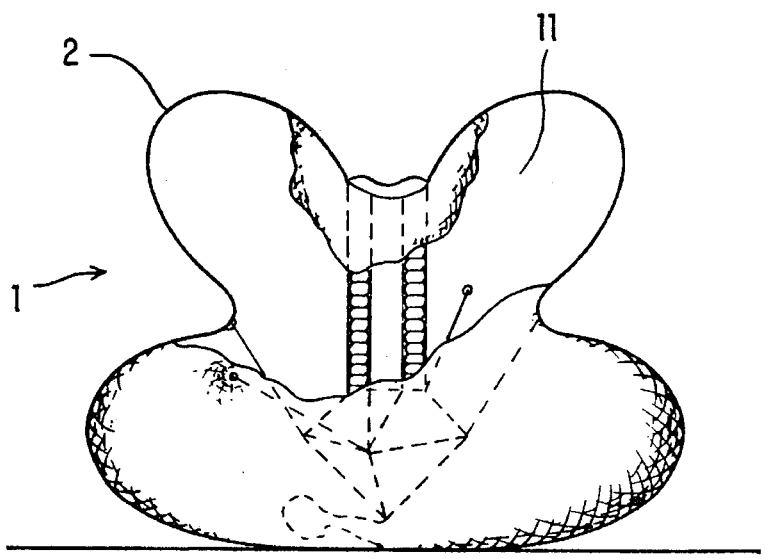
FIG. 2F illustrates a perspective cutaway view of a loaded, spherically-shaped apparatus as illustrated in FIG. 2A, at maximum impact compression upon impact with the ground after descent at terminal velocity.

FIG. 2F illustrates the spherical aircraft of FIG. 2E near maximum deformation. The hull is shown in a grossly distorted configuration, with the cargo compartment close to the point of impact of the apparatus with the ground. FIG. 2F also illustrates the point of maximum compression of inflation fluid 13 within apparatus 1. As can be seen, the distortion of deformable structure 2 provides the cargo with an extended impact distance and an extended impact time, thereby preventing damage to the cargo.

Figure 3:
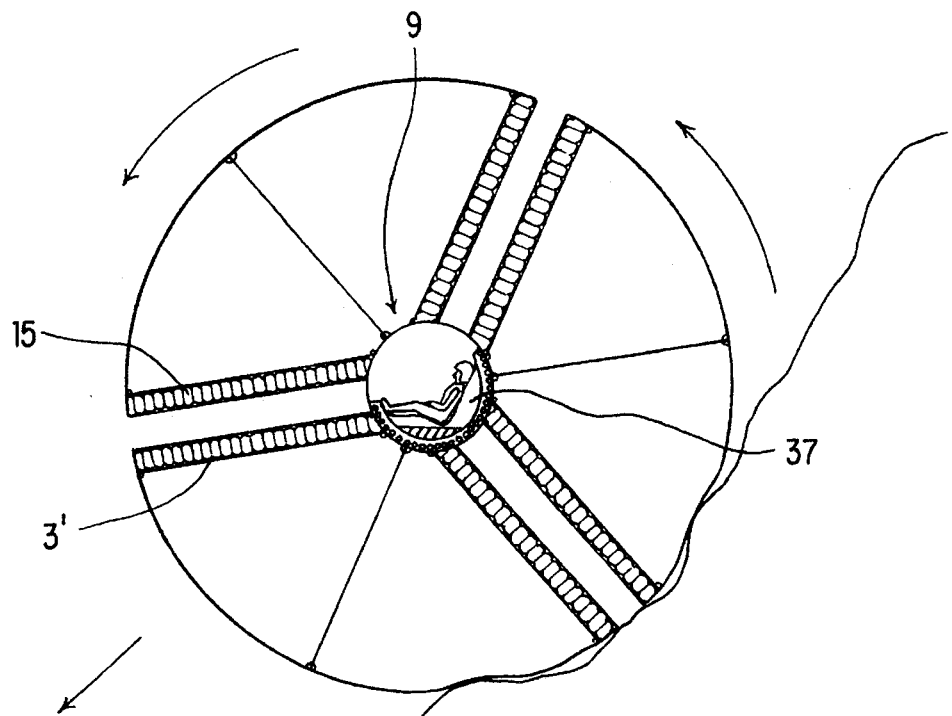
FIG. 3 illustrates a cross-sectional view of an alternative embodiment of a spherically-shaped apparatus according to the present invention, rolling down a steep, rugged slope, and provided with means to keep a passenger seated and upright throughout descent.

FIG. 3 illustrates yet another apparatus according to the present invention, provided with cargo compartment 9 carrying passenger 10 in a manner which allows passenger 10 to sit upright during descent. The apparatus is illustrated rolling down steep, rugged surface, such as a mountain or canyon wall. Three hollow strut assemblies 3', each of which contains an inflated pipe 15, provide fresh air to passenger 10. Cargo compartment 9 is preferably surrounded by a strong, rigid, transparent hollow sphere (constructed using a clear plastic, such as a polycarbonate) having relatively small perforations (not illustrated) at appropriate locations, for airflow into cargo compartment 9 from the air passageways. Within cargo compartment 9 is weighted chair 37, on which passenger 10 is seated, preferably strapped to chair 37. Preferably, chair 37 extends around more than half of an inside circumferential surface within the spherical cargo compartment 9, thereby ensuring that the backside of chair 37 remains against the inside surface of the hollow sphere surrounding cargo compartment 9, thereby preventing chair 37 from tilting in the direction of an impact, which could cause harm to passenger 10. Chair 37 has an outer surface provided with bearings (preferably roller-type bearings, spherical-type bearings, or immobile plastic bearings of a type which do not scratch the surface of (preferably transparent) the rigid sphere surrounding cargo compartment 9, as the inside surface of the sphere rotates with the revolving, descending apparatus. Chair 37 is weighted with weight 39 in a manner to keep passenger 10 in a substantially upright position (regardless of changes in the direction of descent) throughout most, if not all, of the descent. Preferably, the apparatus is constructed from materials as transparent as possible, enabling passenger 10 to enjoy his view of the environment outside the apparatus, throughout descent.

Figure 4:
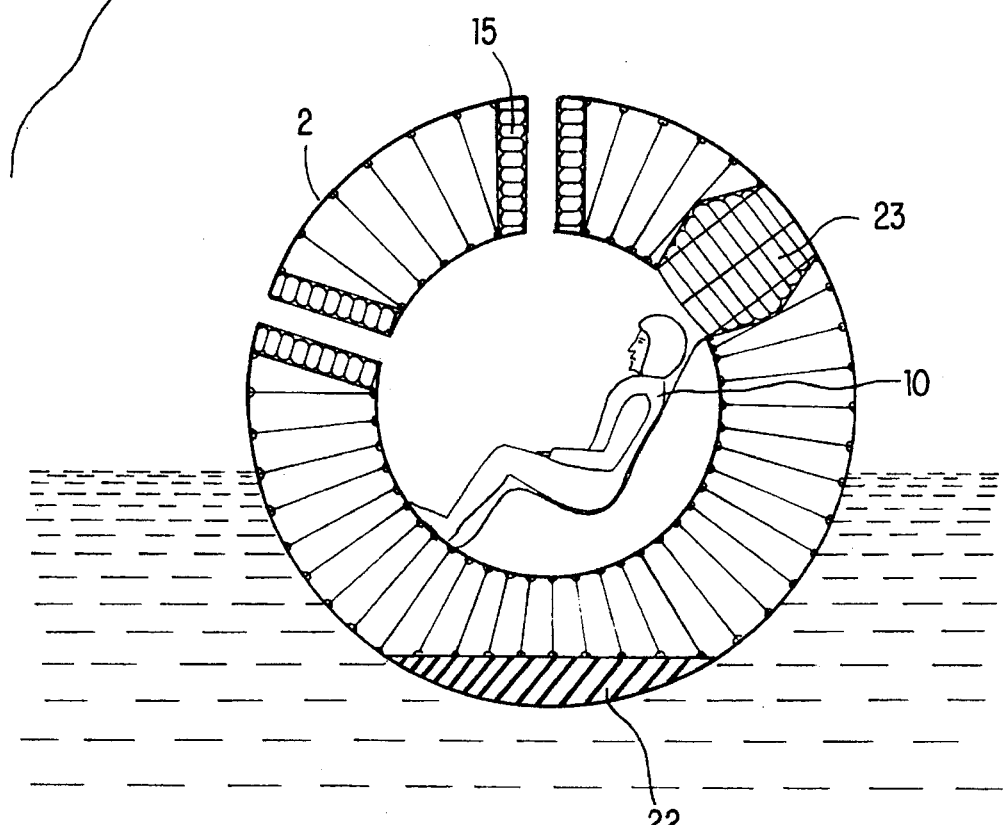
FIG. 4 illustrates a cross-sectional view of a floating spherical watercraft according to the present invention, together with a passenger therein.

FIG. 4 illustrates a cross-sectional view of another according to the present invention, which is especially adapted to sustaining the life of passenger 10 in a hostile water environment. The apparatus illustrated in FIG. 4 illustrates substantially spherical, inflated deformable structure 2 (i.e., hull), which preferably is provided with a plurality of inflatable pipes for supplying fresh air to passenger 10 in cargo compartment 9. The apparatus of FIG. 4 is provided with a plurality of inflated pipes 15 for supplying fresh air to passenger 10. The apparatus is fitted with a plurality of strut members which serve to keep inflated deformable structure 2 from collapsing inward, regardless of the relatively lower ratio of the volume of a pressurized region within inflated structure 2 with respect to the volume of cargo compartment 9. Ingress/egress means for passenger 10 (or the placement of non-passenger cargo) to enter and exit the apparatus is provided in the form of a relatively large "reverse-butterfly" secondary inflated membrane 23, the "reverse-butterfly" being a design which locks the relatively large ingress/egress secondary inflated membrane 23 into position, and which, when deflated, permits the occupant to enter or exit the watercraft. The plurality of inflated pipes 15 provide passageways 16 for the entrance of fresh air into cargo compartment 9.

Inflated deformable structure 2 insulates passenger 10 from the water and wind present in the hostile sea environment, and cushions the occupant from severe impact by waves, the ocean bottom, seawalls, rugged shorelines, etc., while providing passenger 10 with adequate fresh air. Preferably, this apparatus is further provided with ballast 22 in an amount adequate to impart a substantially upright position for passenger 10 during the time spent in the apparatus. Preferably, the apparatus is also supplied with valves (not illustrated) which remain open for the ingress and egress of fresh air through fresh air passageways 16, but which close if water should attempt to enter the cargo compartment through passageways 16. Such valves are known to those of skill in the valve art.

The apparatus illustrated in FIG. 4 is preferably not designed for extended occupancy by a passenger, but rather offers protection from the elements during emergency conditions, until rescue can be effected. The apparatus can be provided with exterior lighting and/or coloration and/or a transmitter, to further aid rescuers seeking to rescue the passenger. Furthermore, the apparatus can be supplied with food, fresh water, and medical supplies, flares, etc., in order to improve the odds of survival of the passenger. The apparatus can also be provided with means for attachment of a tether to further aid in rescue efforts. The apparatus, as illustrated in FIG. 4, has a relatively small outside diameter in order to provide the advantage of low storage volume and quick inflation, so that large numbers of such apparatuses can be inflated in a relatively short period, in the event of emergency upon a sinking ship carrying a plurality of passengers.

Figure 5:
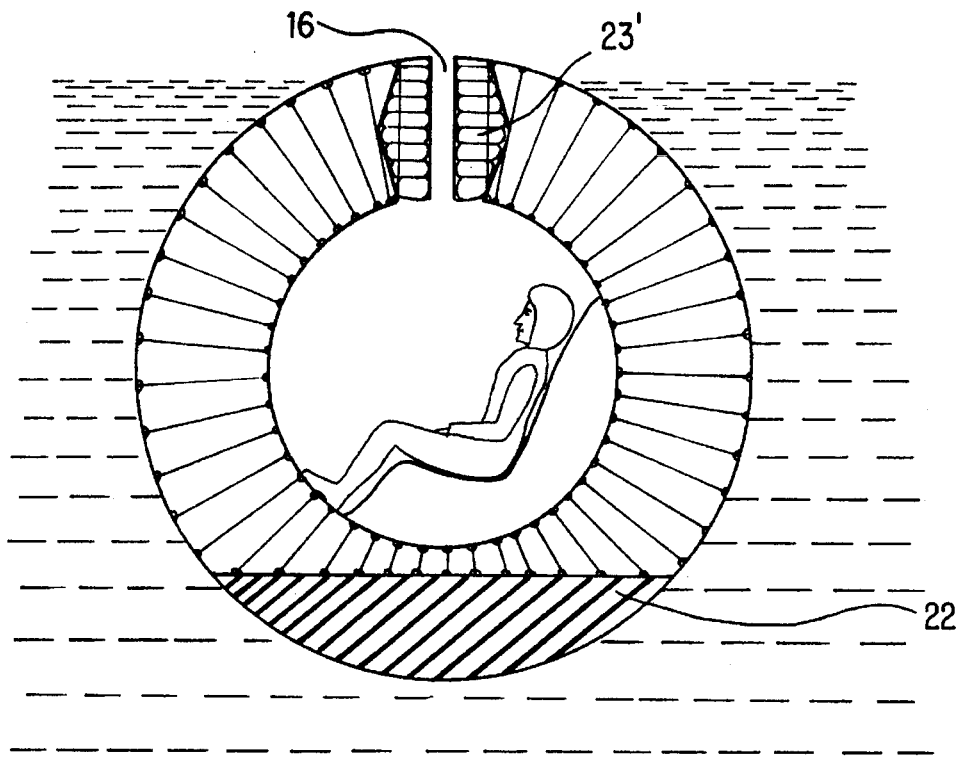
FIG. 5 illustrates an alternative watercraft according to the present invention, together with human cargo therein.

FIG. 5 illustrates a cross-sectional view of yet another apparatus of the present invention, this apparatus being particularly suited to underwater use. The apparatus of FIG. 5 comprises enough ballast to remain almost completely submerged, but is provided with air passageway 16 for supplying fresh air to cargo compartment 9. The apparatus is preferably designed so that the passenger can surface by detaching at least a portion of the ballast (not illustrated), and/or inflating additional inflatable membranes (not illustrated) below the water line, both of which will cause the craft to rise. In the embodiment illustrated in FIG. 5, reverse-butterfly secondary inflated membrane 23' is provided with air passageway 16 therethrough, and thereby serves as both an ingress/egress means as well as providing a passageway for fresh air into cargo compartment 9. Passageway 16 preferably has a valve (not illustrated) therein, to provide for air exchange, but which closes upon submersion in water, to prevent water entry into cargo compartment 9.

Figure 6:
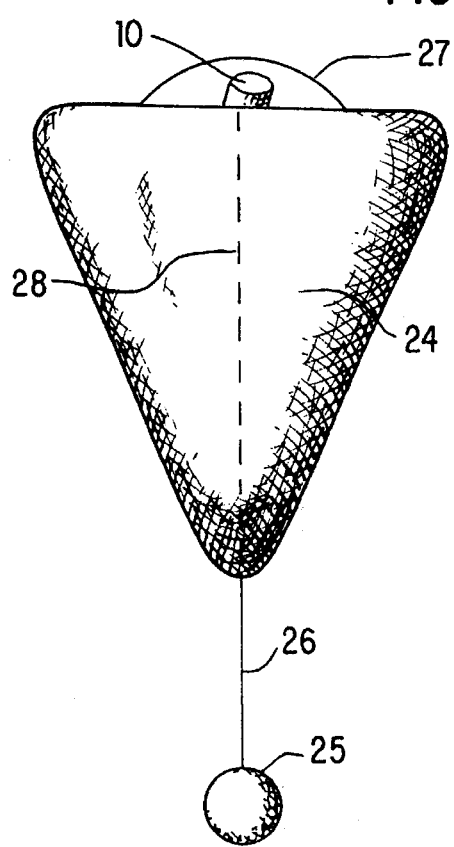
FIG. 6 illustrates a perspective view of an alternative craft according to the present invention, together with cargo thereon.

FIG. 6 illustrates yet another embodiment of an apparatus according to the present invention. This apparatus comprises a substantially conical balloon 24, the apex of which is oriented downward in an aerodynamic position with respect to vertical descent, with orienting weight 25 hanging from the apex of conical balloon 24, via cable 26. The craft is provided with means for suspending cargo on upper deck 27 of conical balloon 24. Orienting weight 25 serves to keep the apex of conical balloon 24 downward during descent of the apparatus. Conical balloon 24 provides air drag to reduce the velocity of the cargo (compared with the unassisted descent of the cargo), and also provides a cushion for the cargo upon impact with the ground. Conical balloon 24 is provided with internal, substantially inextendible, centered strut member 28 (illustrated as a dashed line in FIG. 7), in order to prevent upper deck 27 of conical balloon 24 from taking on a convex shape due to the pressure within conical balloon 24 both from the inflating fluid, as well as the pressure from the force imparted by the air through which conical balloon 24 is descending. Upon impact, the cargo deforms, and is cushioned by, conical balloon 24.

Figure 7:
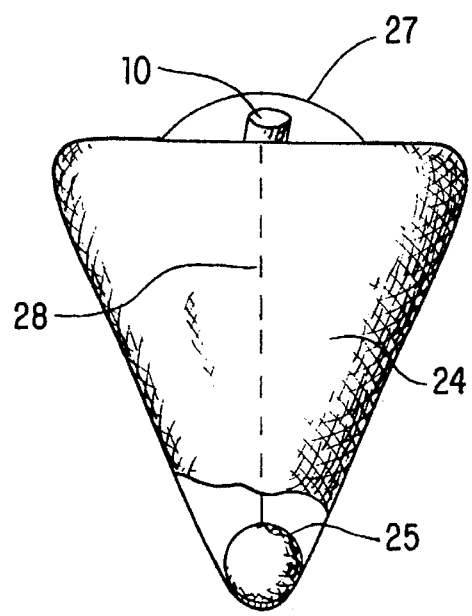
FIG. 7 illustrates a perspective cutaway view of an alternative craft according to the present invention, together with cargo thereon.

FIG. 7 illustrates an alternative to the descent apparatus illustrated in FIG. 6. In the apparatus of FIG. 7, orienting weight 25 is provided within the apex of conical balloon 24. As with the embodiment illustrated in FIG. 6, the apparatus of FIG. 7 is provided with internal, substantially inextendible, centered strut member 28, also illustrated in a dashed line in FIG. 7.

The cone-shaped descent apparatuses illustrated in FIGS. 6 and 7 provide some advantages over a spherical apparatus having an internalized cargo compartment. The conical balloon does not have to have fresh air passageways for a passenger on upper deck 27, and need not be manufactured from a transparent composition in order to allow a passenger thereon to have a view of a substantial portion of the environment during descent. Furthermore, the potential deceleration distance of the cargo during impact is potentially longer than for spherical craft, as substantially the entire balloon is positioned below the cargo. Finally, the conical balloon apparatus with orienting weight is simple to manufacture, as it need not be provided with an internal cargo compartment.

The design (i.e., apex angle, overall length, mass of the balloon-orienting weight, number and positioning of internal struts to prevent distortion of the balloon during the stresses imposed during descent while carrying cargo having a substantial mass) is critical to the successful performance of the apparatus. The orienting weight must be of adequate mass, and the balloon of adequate length and overall size and surface area, to slow the cargo to a non-damaging impact speed, and especially to maintain proper orientation during descent, i.e., a "weight-down orientation." Such designing can be accomplished by those of skill in the art of aerodynamic design, without extensive experimentation, as the general principles of air drag and stability of craft orientation are well understood for craft propelled through the air, e.g., aircraft capable of ascent, such as dirigibles. These same principles of air drag and craft orientation apply to the descent aircraft of the present invention.

A disadvantage of the cone shaped descent apparatus is primarily that the cone is not suited to impact with steep surfaces, such as mountains and canyon walls, and that the cone tips sideways upon impact. Means may be employed to prevent tipping during impact, such as an elastic fabric, means for controlled escape of inflating fluid from conical balloon 24, etc. Furthermore, if the conical balloon is made big enough relative to the mass of the cargo on the upper deck, the sideways tipping will occur at a relatively slow speed, which reduces damage to the cargo. The cargo can be strapped down on the upper deck, or fastened to the upper deck in any other conventional manner. Preferably the cargo is positioned at the center of the upper deck, and preferably the craft has the orienting weight in or on the apex of the cone.

Figure 8:
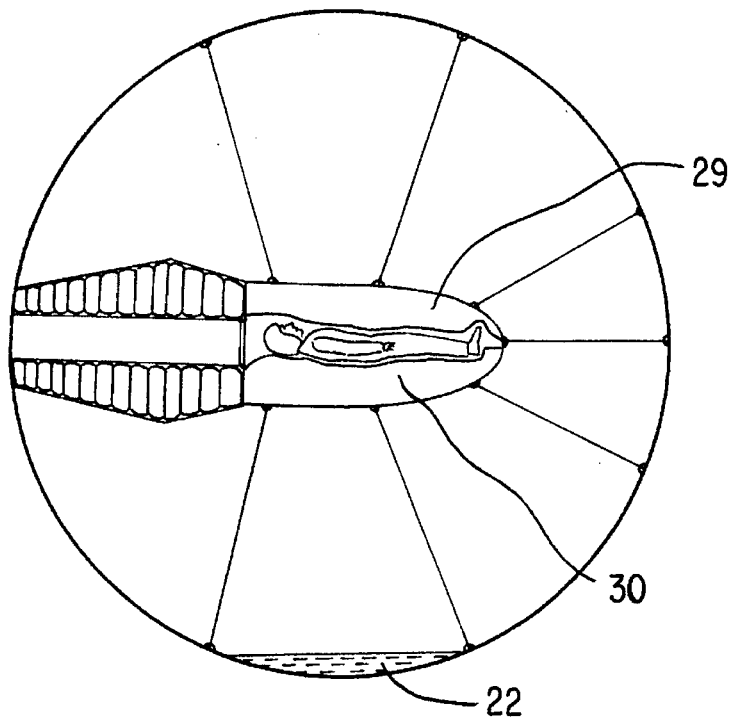
FIG. 8 illustrates a cross-sectional view of an alternative apparatus according to the present invention, together with a passenger therein.

FIG. 8 illustrates yet another embodiment of a preferred descent aircraft of the present invention, carrying human cargo, and provided with craft-orienting ballast 22 and a dual-dovetailed (i.e., "reverse-butterfly") ingress/egress inflatable pipe for supplying fresh air to the cargo. This craft is supplied with two supplemental, secondary inflatable membranes defining secondary inflated volumes (29 and 30) which secure the human cargo within the cargo compartment, and provide a very high area of cushioning for the cargo by allowing an optimized cargo cushioning during impact. The result is a craft which can travel downward at higher speeds, and be of smaller volume relative to the cargo, and still prevent damage to the cargo during impact. Furthermore, the prone, back-down position of the human cargo at impact provides an orientation in which lower tissues of the body are subjected to less pressure from tissues positioned thereabove at impact, for example, compared with impact with the ground in an upright position, which imparts much greater forces as a function of the amount of tissue oriented vertically, in a manner similar to the pressure which would be imparted upon impact of a vertically-oriented tube filled with water (i.e., the pressure at the bottom of the tube would be higher than if the tube is oriented horizontally at impact). Preferably the ballast is water or any other relatively dense, easily deformable substance which is less likely to injure the cargo than, for example, a rigid material such as a metallic ballast.

Figure 9:
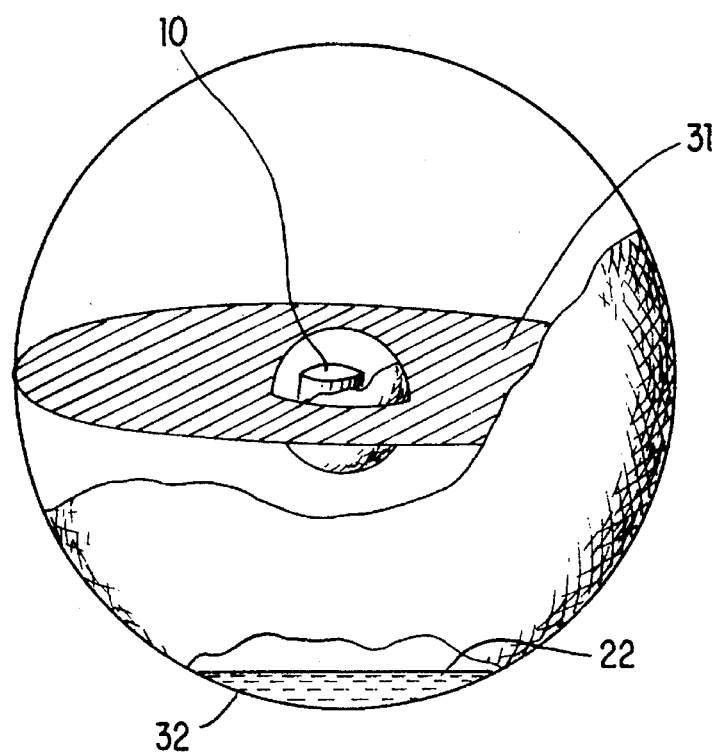
FIG. 9 illustrates a perspective cutaway view of an alternative craft according to the present invention, together with cargo therein.

FIG. 9 illustrates yet another embodiment of a craft according to the present invention, in which an internal membrane (31) provides a "single strut" for suspension of the cargo within the hull (2). Preferably the craft is provided with ballast (22) to provide a desired orientation of the strut to the impact zone (32) of the craft.

The craft design illustrated in FIG. 9 can be constructed using two half spheres, one or both of which have portions which together make up the cargo compartment, or which are fastened directly to the cargo. The two half spheres can be designed to together provide one, two, or even more than two closed, inflated volumes. If, for example, two semi-spheres are used, each semi-sphere can encompass a closed volume separate from the other semi-sphere.

Figure 10A:
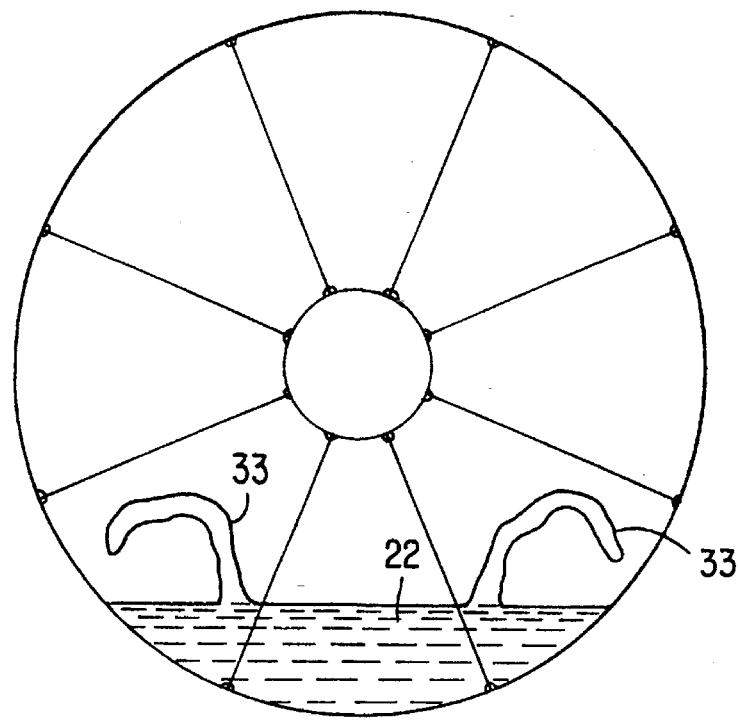
FIG. 10A illustrates a cross-sectional view of an alternative craft according to the present invention.

FIG. 10A illustrates another craft, especially adapted for free fall descent from great heights, this craft being provided with means to prevent "bouncing" upon impact. The craft is provided with a craft-orienting fluid ballast (22) within an enclosed ballast compartment. Extending upward, and defining the enclosure within which the ballast is positioned, are one or more empty, inflatable ballast rebound tubes (33), which are momentarily inflated with the ballast fluid during impact of the craft with the ground. The result is a dampening of the tendency of the craft to rebound upon impact with the ground.

Figure 10B:
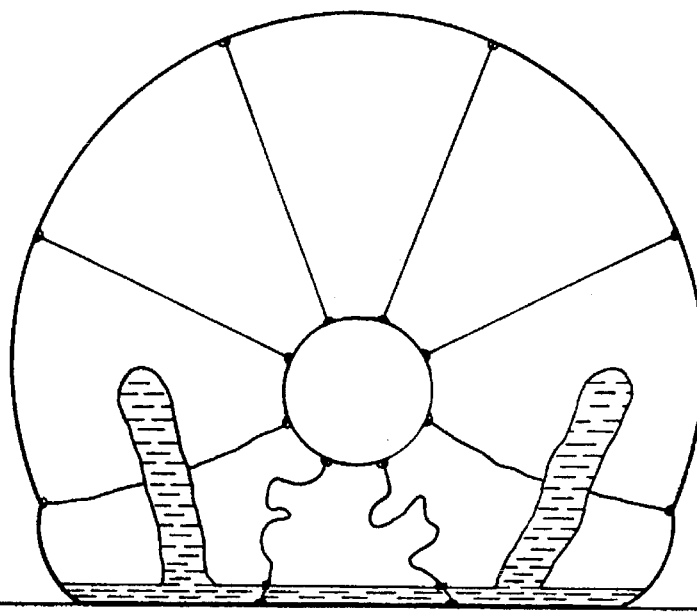
FIG. 10B illustrates a cross-sectional view of an alternative craft according to the present invention.

FIG. 10B illustrates the craft of FIG. 10A at impact with the ground, with the inflatable ballast control tubes inflated with fluid during impact. For most landings of the descent craft from great heights onto the ground, the ballast rebound tubes (33) are inflated only for a brief period during impact, after which the ballast (preferably water) returns, by the force of gravity, to the lower position afforded by a lower inflatable volume within the ballast compartment.

Figure 11:
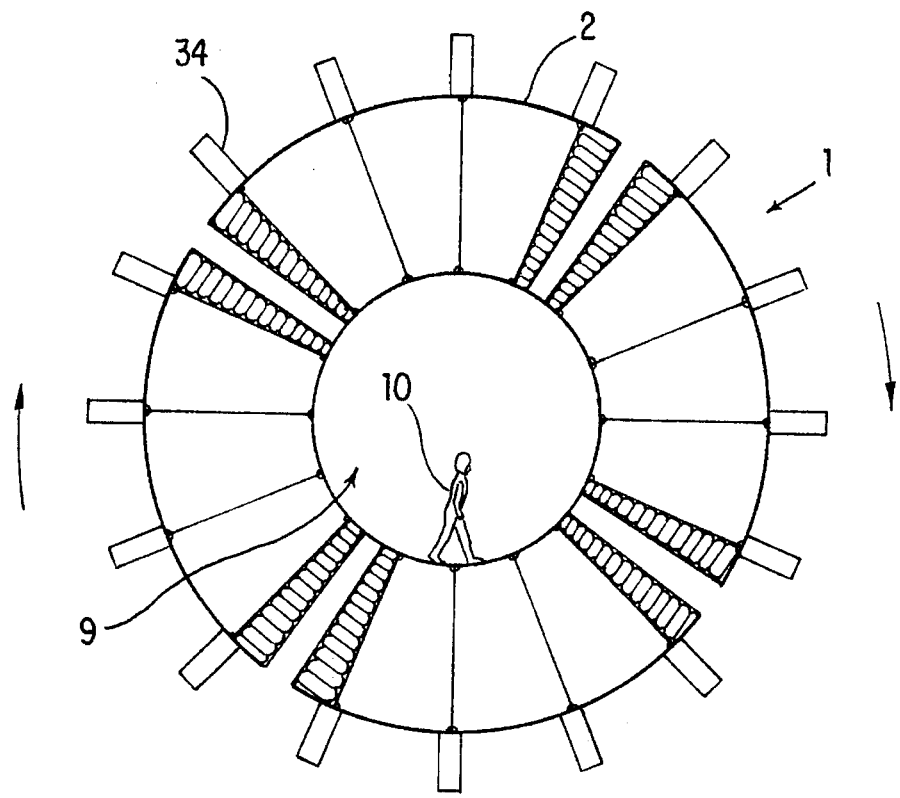
FIG. 11 illustrates a cross-sectional view of another embodiment of the apparatus of the present invention, together with a passenger therein, the apparatus being in descent towards the ground.

FIG. 11 illustrates-yet another embodiment of an apparatus according to the present invention, in which the direction of descent can be controlled to some degree by human cargo (10) causing the craft to rotate by striding along an inner surface of the cargo compartment. The hull of the craft is provided with a plurality of exterior paddles (34), and the rotation of the craft produces a net sideways force which causes the craft to descend in a direction deviating from the direction which would otherwise occur without causing the craft to spin in a desired direction.

Figure 12:
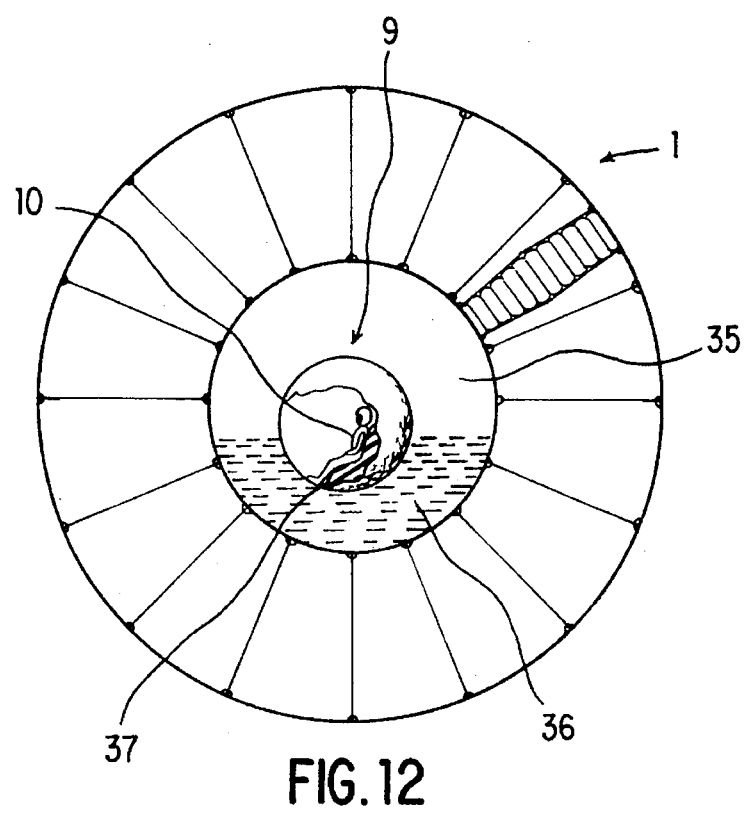
FIG. 12 illustrates a cross-sectional view of an alternative apparatus according to the present invention, together with a passenger therein.
Figure 13:
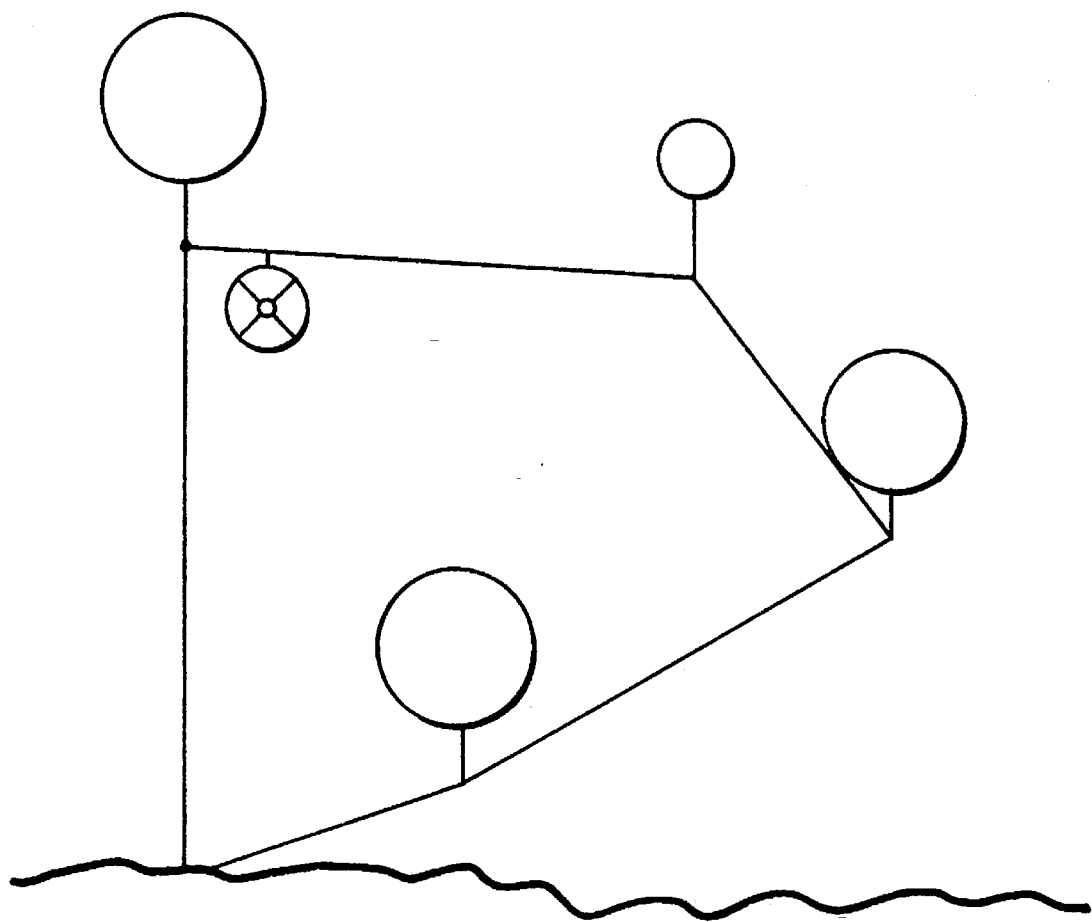
FIG. 13 illustrates a schematic representation of a process of using the apparatus of the present invention.

FIG. 12 illustrates yet another embodiment of an apparatus according to the present invention, which is generally similar to the craft illustrated in FIG. 3. However, the craft of FIG. 12 is provided with intermediate compartment 35 which is partially filled with liquid 36 which is partially displaced by a cargo compartment containing cargo, preferably human cargo 10. The human cargo is preferably seated on seat 37 provided with ballast, as described for FIG. 12, except that the seat need not be provided with bearings, as the fluid 36 in the intermediate compartment 35 serves as a fluid bearing. The amount of fluid need only be enough to displace cargo compartment sphere 9', or simply enough to provide a fluid bearing permitting seat 37 to remain substantially upright.

The craft illustrated in FIG. 12 is illustrated without a supply of fresh air to the cargo compartment. However, the cargo compartment could include a source of oxygen, or the hull could be provided with inflatable pipes (not shown, but similar to 15 illustrated in FIG. 4) fitted with valves (not shown) to ensure that bearing fluid 36 does not escape, when inflatable pipes 15 are positioned under bearing fluid 36.

Although the following description of the theory of operation of the craft of the present invention is believed to be correct, this theory is not intended to limit the scope of the present invention, as the actual basis for the operability of the craft of the present invention may include factors not contemplated herein, and even contrary to the theory discussed below, but operable in nature, as inherent in the craft described herein.

The craft of the present invention combines air drag with air cushioning, to provide a means for slowing the descent of cargo, while simultaneously providing a means for absorbing the force of the resulting relatively low-speed impact (i.e., low speed compared with the speed of the cargo falling with only its own air drag, i.e., without any added air drag). Upon impact, the hull of the craft deforms, reducing the internal volume (and/or transferring energy into stress forces imposed on internal strut members) within the inflated membrane. Because the membrane is airtight, for a spherical craft, the distortion of the hull reduces the pressurized within the inflated membrane, thereby stressing the hull (and struts) of the craft. Thus, the potentially destructive forces at impact are dissipated into the pressurization of the gas within the inflated membrane, and the stress placed on the hull and the struts.

The craft hay even rebound from the impact zone, but the high level of air drag due to the relatively large size of the hull, compared with cargo size, reduces rebound travel and rebound forces. Furthermore, any recovery of the deformation of the hull by the more slowly decelerating cargo (i.e., more slowly decelerating than the hull of the craft) absorbs still more energy of impact, thereby further lowering rebound tendencies of the craft and cargo.

Thus, the result of the craft is to allow a relatively heavy, dense cargo to descend with more of the characteristics of a marshmallow than a rock. That is, the craft is designed to lower the effective density of the descending cargo. With the proper design and execution, which is readily apparent to those of skill in the art of aerodynamic design, the result can be a much lower terminal velocity for any given descent, coupled with a very high level of shock protection for the cargo during impact.

The reduction in the terminal velocity is largely a function of the effective cross sectional area of the hull, as well as the overall surface area of the hull. Once the craft, together with its cargo, reaches terminal velocity, the additional kinetic energy which the cargo would have gathered before impact is transferred to the displacement of the atmosphere through which the craft is descending. The energy required to displace the atmosphere manifests itself as air drag, thereby keeping the rate of descent at the lower maximum rate.

It should be noted that without strut members of some type, the mere placement of the cargo within the hull will cause the hull to be distorted (i.e., elongated) upon descent, thereby allowing for higher and higher terminal velocities, with the resulting much less effective use of the surface area of the hull in slowing the descent of the cargo. Thus, the struts play a key role in the craft of the present invention.

Finally, upon impact of the craft with the ground, the inward pull of the upper strut members positioned above the cargo is equal to the force the cargo would have had it landed squarely on the top of the inflated craft. Thus, if the hull and struts are built to withstand such an impact, they will withstand the impact with the cargo positioned inside of the craft.

Returning now to the details of the design, construction, and operation of the craft of the present invention, the inflating fluid (13) for use in the inflatable the craft may comprise a gas and/or a liquid, but is preferably a gas. The gas may comprise air and/or a gas lighter than air and/or a gas heavier than air. Air, and gases lighter than air, especially helium, are preferred. Of course, if a gas lighter than air is used as the inflating fluid (13), the speed of descent of the craft will be lower than if air, or a fluid heavier than air, is used as the inflating fluid, as the overall density of the craft is reduced by the use of a lighter-than-air gas, such as helium. Furthermore, the craft can even be designed for use as an airship, i.e., for both ascent and descent, by filling the craft with a lighter-than-air fluid, such as helium, and providing the craft with a means to exchange helium for air, enabling the craft to descend at a desired time.

Although the hull shape is virtually unlimited, a spherical hull shape is preferred, due to its uniformity of impact protection. Upon deformation during descent and/or impact, an inelastic spherical hull can only decrease in volume. Furthermore, the air drag of a spherical hull shape is independent of the orientation of the cargo within the craft, unlike all other hull shapes. Finally, a spherical hull shape is preferred for craft designed to roll down and across the surface of water and/or land, both substantially horizontal surfaces, as well as inclined surfaces.

The pressure of the inflated hull of the craft is preferably relatively low, i.e. preferably about 1–1.5 atmospheres, and more preferably about 1 atmosphere. However, the pressure is preferably relatively high for craft carrying relatively heavy cargo per unit of inflated craft volume, as the pressure upon descent is greater (which, if the pressure is too low, produces deformation of the inflated craft and subsequently higher descent speed than desired). All other factors remaining the same, a high cargo weight to hull volume ratio produces a greater amount of deformation upon impact, and therefore requires a higher hull pressure, because of the greater cargo momentum which must be absorbed by the craft upon impact.

The hull of the craft can be constructed from any deformable (i.e., flexible) material which can absorb the forces at impact. Preferred materials for the construction of the hull include composite materials such as fiber reinforced plastics, designed to strongly resist ripping and puncture. Especially preferred are those fibers and plastics known for their toughness. The material for the construction of the hull may be relatively elastic or relatively inelastic. Elastic materials can cushion impact more, but require a larger craft or higher pressure, in order to keep the cargo from "bottoming out" during impact. Inelastic materials provide greater compression of the inflating fluid, and permit the construction of smaller craft sizes, but force the cargo to decelerate over a shorter distance during impact.

Although it is preferable to inflate the hull, the hull may be uninflated, so long as it is rigid enough, and deformable enough, to withstand the forces during descent and impact. However, since the diameter of the craft is preferably from about 15 to 30 feet for a cargo of a 180 pound human being, it is preferable, for transport and stowage of the craft, that the hull be an inflatable membrane. An inflated hull is also preferred because of the resulting lightness of the craft, and the resiliency of the craft upon multiple use and/or multiple impacts during descent.

Although the craft may contain a plurality of separate inflated compartments, preferably the craft contains only one inflated compartment, in order that the pressure increase upon impact is spread evenly throughout the entire inflated volume of the craft, and throughout the hull. Optionally, the hull or other craft portions may be fitted with blowout valves to provide some additional deceleration time for especially hard impact of craft carrying an especially heavy cargo load, as well as assisting in lowering the cargo compartment to ground level.

The material for the construction of the cargo compartment is similar in requirements and effect as the material for the construction of the hull. However, for some uses, such as the craft described in FIGS. 3 and 12 above, the cargo compartment is preferably constructed as a rigid, transparent sphere, preferably from a tough plastic such as a polycarbonate. Other plastics which can be used include nylon, polyester, acrylic polymers, aramid polymers, as well as polyethylene and polypropylene, especially ultra high molecular weight polyethylene and aramid.

A highly transparent hull, cargo compartment, inflated pipes, and ingress/egress plugs are preferred for certain uses, such as craft designed for recreational use, and in situations in which information received visually can be meaningful. Transparent polymeric films and fibers can be used to achieve transparency of the craft.

The struts keeps the cargo suspended above the impact zone on the hull. Preferably, the struts comprise a plurality of flexible cords, or one or more membranes extending from the hull to the cargo and/or cargo compartment. Preferably, the struts comprise a plurality of flexible, substantially inelastic strut cords radially positioned from the cargo and/or cargo compartment to the hull. The number of strut cords should, in general, be at least 4; preferably, from 4 to about 500 in number. Still more preferably, the number of cords is from 6 to about 200, and still more preferably, from 6 to about 100. Preferably the struts are positioned symmetrically with respect to the center of the craft, so that the suspension of the cargo is as balanced as possible. The cords are preferably of a type commonly referred to as "parachute cord", a relatively inelastic woven flat nylon cord having a breaking strength of at least several hundred pounds.

As an alternative, the struts can be of a telescoping variety for shock absorption. However, such a design is less preferred than the strut cords described above, due to the added weight of such struts.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

I claim:

1. An apparatus comprising:

(A) an inflated, deformable membrane surrounding an enclosed, substantially airtight volume and capable of withstanding impact on termination of descent; and (B) a plurality of flexible cords extending inwardly from the membrane to a cargo, for suspending the cargo in spaced relationship above an impact zone on said membrane; and wherein said apparatus has a design effective to prevent damage to the fragile cargo upon impact from a vertical free fall of 30 feet onto a hard horizontal concrete surface.

2. An apparatus comprising:

(A) an inflated, deformable membrane surrounding an enclosed, substantially airtight volume and capable of withstanding impact on termination of descent; and (B) a plurality of flexible cords extending inwardly from the membrane to a cargo, for suspending the cargo in spaced relationship above an impact zone on the membrane; and wherein said apparatus has a design effective to lengthen a duration of the cargo impact period by a factor of at least 5 at an impact from a vertical freefall onto a hard surface from a height of 30 feet, relative to a cargo impact period of the cargo alone undergoing impact from a vertical freefall from a height of 30 feet.

3. An apparatus comprising:
(A) an inflated, deformable membrane surrounding an enclosed, substantially airtight volume and capable of withstanding impact on termination of descent; and
(B) a plurality of flexible cords extending inwardly from the membrane to a cargo, for suspending the cargo in spaced relationship above an impact zone on the membrane; and
wherein said apparatus has a design effective to reduce, by at least 25%, a terminal vertical freefall velocity of the cargo in the apparatus, relative to a terminal vertical freefall velocity of the cargo alone.

4. An apparatus comprising:
(A) an inflated, deformable membrane surrounding an enclosed, substantially airtight volume and capable of withstanding impact on termination of descent; and
(B) a plurality of flexible cords extending inwardly from the membrane to a cargo, for suspending the cargo in spaced relationship above an impact zone on the membrane; and
wherein said apparatus has a design effective to lengthen, by at least 25%, a duration of a cargo/craft fall period from a vertical freefall from a height of 5000 feet, relative to a duration of a cargo alone fall period from a vertical freefall from a height of 5000 feet.

5. An apparatus comprising:
(A) an inflated, deformable membrane surrounding an enclosed, substantially airtight volume, said membrane being capable of withstanding impact on termination of descent, and having a minimum dimension of at least 8 feet;
(B) a plurality of flexible cords extending inwardly from the membrane to a cargo, for suspending the cargo in spaced relationship above an impact zone on the membrane.

6. The apparatus according to claim 5, wherein:
said deformable membrane comprises a hull establishing a substantially spherically-shaped outer perimeter of said apparatus;
said means for suspending the cargo comprises at least one strut between a centrally-located cargo compartment and said hull; and
said membrane has a diameter of from 8 to 80 feet.

7. The apparatus according to claim 6, wherein said at least one strut comprises at least 3 flexible strut members positioned between the cargo and said hull, said strut members being spaced substantially equidistant from each other.

8. The apparatus according to claim 6, wherein said apparatus comprises a plurality of substantially separate inflated volumes.

9. The apparatus according to claim 6, wherein said inflated, substantially airtight membrane is inflated with a fluid comprising air.

10. The apparatus according to claim 6, wherein said apparatus further comprises means to reduce rebound upon a descent-terminating impact.

11. The apparatus according to claim 6, wherein said membrane comprises means for a human cargo, in said cargo compartment, to view an environment surrounding said apparatus through said membrane.

12. The apparatus according to claim 6, wherein said membrane comprises fibrous reinforcement.

13. The apparatus according to claim 6, wherein at least one member selected from the group consisting of said strut and said membrane are constructed to elongate from about 0.001% to 80% during a descent-terminating impact from a terminal velocity of said apparatus, when said apparatus is loaded with the cargo.

14. The apparatus according to claim 6, wherein:
said membrane is a primary membrane, said primary membrane further comprising a primary tunnel wall forming tunnel from said hull to said cargo compartment, and serving as a hollow strut member positioned from said hull to the cargo compartment, said primary tunnel and said cargo compartment being outside said enclosed, substantially airtight volume within said inflated, deformable primary membrane, said primary tunnel being sized to permit ingress and egress of said cargo;
said apparatus further comprising a secondary inflatable membrane designed to inflate so that it is secured within said tunnel, to prevent the cargo from exiting through said primary tunnel, and to provide additional protection and shock absorption for said cargo from impact at said primary tunnel, by an object contacted by said apparatus.

15. The apparatus according to claim 14, wherein said secondary inflatable membrane secured in said primary tunnel comprises internal struts positioned between an outer secondary membrane portion and an inner secondary membrane portion, and said inner secondary membrane portion forms a secondary tunnel sized to prohibit egress of the cargo while permitting a supply of fresh air to enter said cargo compartment.

16. The apparatus according to claim 14, further comprising from 2 to 50 primary tunnels and from 2 to 50 secondary inflatable membranes.

17. The apparatus according to claim 15, further comprising a hollow, rigid inner sphere connected to said deformable membrane by at least one strut, and a passenger compartment within said inner sphere, said compartment comprising means for maintaining a passenger in an upright position during descent of the apparatus.

18. The apparatus according to claim 17, wherein:
said membrane is constructed from a first substantially transparent composition;
wherein said hollow, rigid inner sphere is constructed from a second substantially transparent composition, and wherein said apparatus comprises means to allow a continuous supply of outside air into said rigid, hollow inner sphere, and said rigid inner sphere and said means to maintain the human passenger upright during descent comprises a weighted chair comprising a bearing member on a back side thereof; and
wherein said apparatus comprises means for preventing said back side of said chair from disengaging an inner spherical surface of said hollow, rigid inner sphere, during descent and impact of said apparatus.

19. A descent process, comprising: providing, at an elevated location, an apparatus having a cargo therein, said apparatus comprising:
(i) an inflated, deformable membrane surrounding an enclosed, substantially airtight volume, said membrane being capable of withstanding impact on termination of descent, and having a minimum dimension of at least 8 feet;
(ii) a plurality of flexible cords extending inwardly from the membrane to a cargo, for suspending the cargo in spaced relationship above an impact zone on the membrane; followed by releasing said apparatus from the elevated location.

20. The process according to claim 19, wherein:

said deformable membrane comprises a substantially spherically-shaped outer hull;

said means for suspending the cargo comprises a strut between a centrally-located cargo compartment and said hull; and said membrane has a diameter of from about 15 to 80 feet.

21. The process according to claim 19, wherein:

a descent guide cable is provided from said elevated location to said landing location; and said loaded descent craft is provided with means to follow said descent guide during said descent.

22. The process according to claim 21, wherein said apparatus is hauled to said elevated location with a lighter-than-air craft, and said lighter-than-air craft is on a tether, said tether also serving as a descent guide cable; and said loaded descent craft is provided with means to follow said descent guide during said descent.

23. The process according to claim 22, wherein said descent guide cable is positioned along a directed course of descent in which said guide cable is supported at a plurality of positions, so that said loaded descent craft can descend over said directed course of descent.

* * * * *